United States Patent
Tzortzatos et al.

(10) Patent No.: US 11,074,195 B2
(45) Date of Patent: *Jul. 27, 2021

(54) ACCESS TO DYNAMIC ADDRESS TRANSLATION ACROSS MULTIPLE SPACES FOR OPERATIONAL CONTEXT SUBSPACES

(71) Applicant: International Business Machines Corporation, Armonk, NY (US)

(72) Inventors: Elpida Tzortzatos, Lagrangeville, NY (US); Steven M. Partlow, Beacon, NY (US); Scott B. Compton, Hyde Park, NY (US); Christine Michele Yost, Hopewell Junction, NY (US); Peter Jeremy Relson, Ulster Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/456,006

(22) Filed: Jun. 28, 2019

(65) Prior Publication Data
US 2020/0409861 A1  Dec. 31, 2020

(51) Int. Cl.
*G06F 12/10* (2016.01)
*G06F 12/109* (2016.01)

(52) U.S. Cl.
CPC ...... *G06F 12/109* (2013.01); *G06F 2212/657* (2013.01)

(58) Field of Classification Search
CPC .............. G06F 12/109; G06F 2212/657
See application file for complete search history.

(56) References Cited

U.S. PATENT DOCUMENTS

| 4,945,480 | A | 7/1990 | Clark et al. |
| 5,023,773 | A | 6/1991 | Baum et al. |
| 5,220,669 | A | 6/1993 | Baum et al. |
| 5,361,356 | A | 11/1994 | Clark et al. |
| 5,745,676 | A | 4/1998 | Hobson et al. |
| 5,873,128 | A | 2/1999 | Kimura et al. |

(Continued)

FOREIGN PATENT DOCUMENTS

EP    1168158 A2    1/2002

OTHER PUBLICATIONS

Anonymous; "Chapter 15: Memory Mapping and DMA"; Memory Management in Linux; Jan. 21, 2005, 52 pages.

(Continued)

*Primary Examiner* — Ryan Bertram
(74) *Attorney, Agent, or Firm* — Cantor Colburn LLP; Teddi Maranzano

(57) ABSTRACT

A computer-implemented method for switching between a full space and a subspace across multiple address spaces is described. A non-limiting example of the computer-implemented method includes determining, by a processor, that switching between the full space and the subspace is enabled by examining a bit in a control register. The method determines, by the processor, that there is a new context different from an existing context based on the bit in the control register indicating that switching is enabled and switches, by the processor, the context of the multiple spaces based on determining that the new context is different from the existing context.

20 Claims, 7 Drawing Sheets

(56) References Cited

U.S. PATENT DOCUMENTS

| | | | |
|---|---|---|---|
| 5,923,864 | A | 7/1999 | Inoue |
| 6,286,089 | B1 | 9/2001 | Greiner et al. |
| 6,553,477 | B1 | 4/2003 | Krishna et al. |
| 6,976,255 | B1 | 12/2005 | Clark et al. |
| 7,555,628 | B2 | 6/2009 | Bennett et al. |
| 9,576,031 | B1 | 2/2017 | Aggarwal et al. |
| 9,792,160 | B2 | 10/2017 | Shear et al. |
| 10,075,384 | B2 | 9/2018 | Shear et al. |
| 2005/0257030 | A1 | 11/2005 | Langhammer |
| 2006/0026384 | A1 | 2/2006 | Brandt et al. |
| 2007/0067602 | A1 | 3/2007 | Callister et al. |
| 2009/0217098 | A1 | 8/2009 | Farrell et al. |
| 2010/0185831 | A1 | 7/2010 | Iguchi |
| 2010/0313201 | A1 | 12/2010 | Warton et al. |
| 2012/0072669 | A1 | 3/2012 | Nishiguchi et al. |
| 2013/0339562 | A1 | 12/2013 | Greiner et al. |
| 2014/0068137 | A1 | 3/2014 | Kegel et al. |
| 2014/0181463 | A1 | 6/2014 | Greiner et al. |
| 2014/0208059 | A1 | 7/2014 | Kogge |
| 2015/0089184 | A1 | 3/2015 | Mukherjee et al. |
| 2015/0301950 | A1 | 10/2015 | Bybell et al. |
| 2015/0301951 | A1 | 10/2015 | Bybell et al. |
| 2018/0060121 | A1 | 3/2018 | Nassi et al. |
| 2018/0373561 | A1 | 12/2018 | Nassi et al. |
| 2019/0163643 | A1* | 5/2019 | Yang .............. G06F 12/1009 |
| 2019/0205261 | A1 | 7/2019 | Cheriton |
| 2020/0409862 | A1* | 12/2020 | Morgenstern ....... G06F 12/1009 |

OTHER PUBLICATIONS

Anonymous; "Database Optimizer Based on Column Usage-Context"; An IP.com Prior Art Database Technical Disclosure: IPCOM000246232D; May 18, 2016; 4 pages.

Anonymous; "GRC Integration Protocol"; An IP.com Prior Art Database Techinical Disclosure: IPCOM000232450D; Nov. 11, 2013; 8 pages.

Anonymous; "System and Method for Clustering ensuring Convexity in Subspaces;" An IP.com Prior Art Database Techinical Disclosure: IPCOMM000233885D; Dec. 26, 2013; 4 pages.

IBM; "A Materialized View Management System and Method to Scale up Classification and Dynamic Extension in Practical ORM System Loosely Coupled with Ontology Repository"; IP.com: IPCOM000168011D; Feb. 28, 2008; 7 pages.

IBM; "Method and System for dynamic extensible process address space (process address space virtulization)"; An IP.com Prior Art Database Technical Disclosure: IPCOM000187697D; Sep. 16, 2009; 4 pages.

List of IBM Patents or Patent Applications Treated as Related; Date Filed: Jun. 28, 2019; 2 pages.

Morgenstern et al.; "Dynamically Joining and Splitting Dynamic Address Translation (DAT) Tables Based on Operational Context"; U.S. Appl. No. 16/456,075, filed Jun. 28, 2019.

Tzortzatos et al., "Private Space Control Within a Common Address Space"; U.S. Appl. No. 16/456,084, filed Jun. 28, 2019.

Tzortzatos et al.; "Operational Context Subspaces"; U.S. Appl. No. 16/456,000, filed Jun. 28, 2019.

Anonymous; "Share Maps: An Application Independent Mechanism for Socially Combining Network Domains"; An IP.com Prior Art Database Technical Disclosure: IPCOM000243494D; Sep. 24, 2015; 5 pages.

Salla et al. "IBM Redbook ABCs of zOS vol. 10", May 4, 2018 [retrieved Oct. 16, 2020]. Retrieved from the Internet: <URL: http://redbooks.ibm.com/abstracts/SG246990.html> (Year: 2018).

Linux "Context Switch Definition" online indexed on Feb. 18, 2010, [retrieved on Feb. 16, 2021]. Retrieved from the Internet:<URL:https://web.archive.org/web/20100218115342/http://www.linfo.org/context_switch.html> (Year 2010).

* cited by examiner

ACCESS TO DYNAMIC ADDRESS TRANSLATION ACROSS MULTIPLE SPACES FOR OPERATIONAL CONTEXT SUBSPACES

BACKGROUND

The present invention generally relates to memory access and more specifically, to access to dynamic address translation across multiple spaces for operational context subspaces.

Dynamic address translation (DAT) tables are used to map virtual address to the real addresses in a memory structure. Each address space has unique DAT tables and real page frames linking back to virtual pages. DAT is the process of translating a virtual address during a storage reference into the corresponding real address. If the virtual address is already in central storage, the DAT process may be accelerated through the use of a translation lookaside buffer (TLB). If the virtual address is not in central storage, it is brought in from auxiliary storage. DAT is implemented by both hardware and software through the use of page tables, segment tables, region tables, and TLBs.

SUMMARY

Embodiments of the present invention are directed to a computer-implemented method for switching between a full space and a subspace. A non-limiting example of the computer-implemented method includes determining, by a processor, that switching between the full space and the subspace is enabled by examining a bit in a control register. The method determines, by the processor, that there is a new context different from an existing context based on the bit in the control register indicating that switching is enabled and switches, by the processor, the context of the spaces based on determining that the new context is different from the existing context.

Embodiments of the present invention are directed to a system for switching spaces between a full space and a subspace. A non-limiting example of the system includes a processor and a memory communicatively coupled to the processor. The memory has stored therein instructions that when executed cause the processor to determine that switching spaces between the full space and the subspace is enabled by examining a bit in a control register. The instructions cause the processor to determine that there is a new context different from an existing context based on the bit in the control register indicating that switching is enabled and switch the context of the spaces based on determining that the new context is different from the existing context.

Embodiments of the present invention are directed to a computer program product for switching spaces between a full space and a subspace. A non-limiting example of the computer program product includes a computer readable storage medium having program instructions embodied therewith. The program instructions are executable by a processor to cause the processor to perform a method. A non-limiting example of the method includes determining that switching spaces between the full space and the subspace is enabled by examining a bit in a control register. The method also determines that there is a new context different from an existing context based on the bit in the control register indicating that switching is enabled and switches the context of the spaces based on determining that the new context is different from the existing context.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
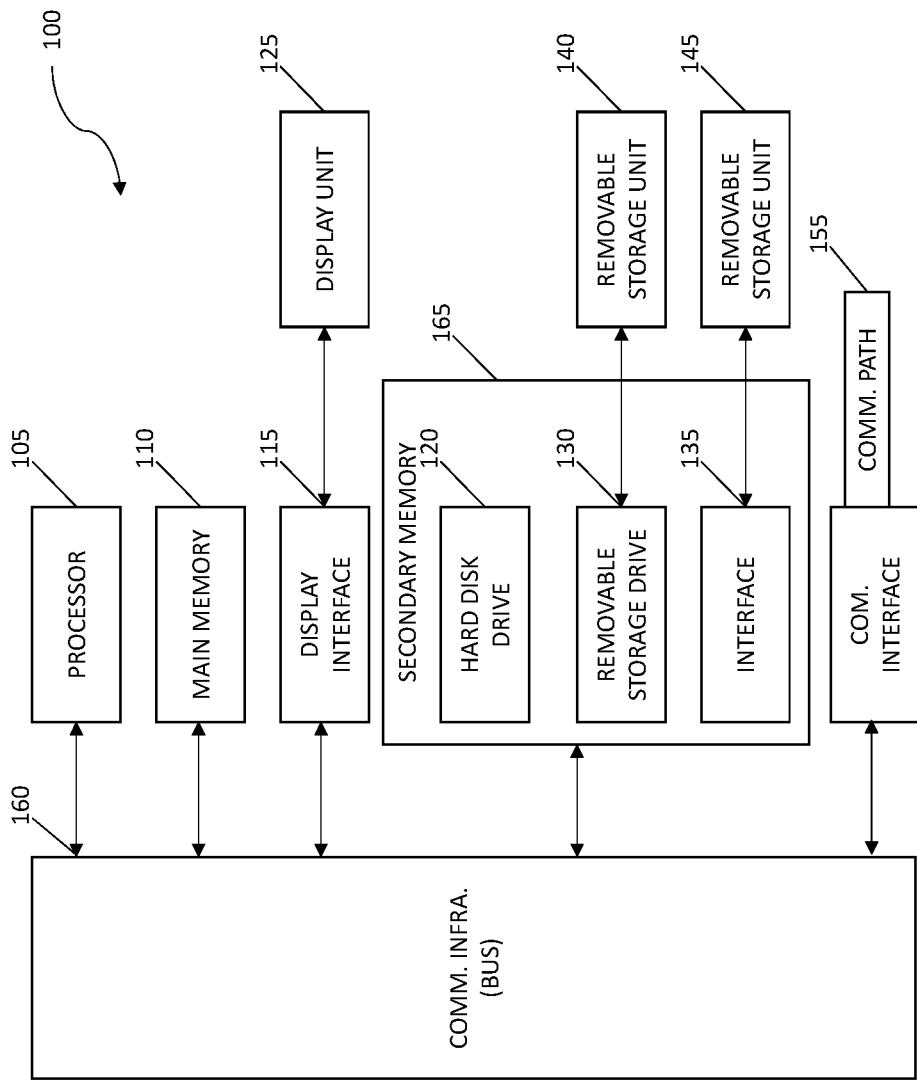
FIG. 1 depicts a high-level block diagram computer system, which can be used to implement embodiments of the present invention.

In accordance with one or more embodiments of the present invention, an address space can be mapped to a subset of a common area used by other address spaces. One or more embodiments of the present invention are compared to contemporary systems where all address spaces sharing a common area must map the entire common area of the address space in the same way. This ability to map to a subset of the common area can result in improved system performance. One or more embodiments of the present invention can be used to allow more virtual memory to be used for private space or to limit access to some virtual memory locations.

An address space is the range of virtual addresses that an operating system (OS) assigns to a user or separately running program. The address space is typically an area of contiguous virtual addresses available for executing instructions and storing data. A virtual storage layout of an address space includes, among other things, a private area and a common area. The common area contains system control programs and control blocks including, for example, a prefixed storage area (PSA), a common service area (CSA), a pageable link pack area (PLPA), a fixed link pack area (FLPA), a modified link pack area (MLPA), a system queue area (SQA), and nucleus. Multiple address spaces can use the same common area. The private area contains, for example, a local system queue area (LSQA), a scheduler work area (SWA), and a private region for running programs and storing data.

An address space is referenced by an address control element (ASCE) which is made up of the address of the highest level translation table for that address space. When operating in a secure environment, the private area uses a private-space control bit to restrict access. One private-space-control bit is bit 55 of the ASCE which indicates whether the space (e.g., a data space or real space) is private. When the private-space-control bit is set to ON, TLB entries within common segments do not apply to this space. The private-space-control bit also disables other features for that space including fetch protection override of PSA and low-address protection of PSA, and use of common regions.

Certain OSs can activate fetch-protection-override, which causes fetch protection to be ignored for the first two thousand (2K) virtual addresses (e.g., VSAs 0-2047). This allows execution in any key to read the first 2K of the PSA even though the frame is "fetch" protected. Key protection includes a two level protection structure, comprised of a supervisory level (key 0) and a non-supervisory level (keys 1-15). Supervisory programs can access non-supervisory assigned storage blocks, but the non-supervisory programs cannot access the supervisory assigned storage blocks. The second 2K (e.g., VSAs 2048-4095) of the first page of the PSA is protected from read access by non-key 0 programs. However, fetch-protection-override does not apply when the private-space-control bit in the ASCE is set.

An address space that is mapped to a subset of a common area used by other address spaces is referred to herein as a "partial address space" and an address space that maps to the entire common area is referred to herein as a "full address space. These address spaces can be used to control access to some storage such as those in an operational context subspace (OCS). An OCS is a subspace defined by the external environment that influences its operation.

Contemporary addressing schemes require that full address spaces and partial address spaces be built well in advance of their use, wasting precious computer resource time and energy.

One or more embodiments of the present invention provide a method to switch context and multiple tables through a single bit in a control register. Additionally, context switching is used to not only switch between DAT tables, but also to switch between address space second table entries (ASTEs), dispatchable unit control tables (DUCTs), access lists, and destination ASTEs (DASTEs). The above-described aspects of embodiments of the present invention address shortcomings of the prior art by providing easy, fast switching of the above listed items through the simple examination of the single control bit. There is limited extra storage usage and very little extra performance overhead. Thus, the invention dramatically improves computer functionality by more efficiently using computer resources.

Existing technology enables support of a server subspace. For example, in Multiple Virtual Storage ("MVS") a server subspace is created by the create and delete a subspace service ("IARSUBSP") and uses a DASTE to identify the server subspace. The Branch In Subspace Group (BSG) instruction is used to enter or exit the server subspace. The server subspace cannot be used for security and requires an application to explicitly request to enter to exit subspace mode.

Turning now to FIG. 1 a high-level block diagram of a computer system 100 which can be used to implement embodiments of the present invention is generally shown. More specifically, computer system 100 can be used to implement some hardware components of embodiments of the present invention. Although one exemplary computer system 100 is shown, computer system 100 includes a communication path 155, which connects computer system 100 to additional systems (not depicted) and can include one or more wide area networks (WANs) and/or local area networks (LANs) such as the Internet, intranet(s), and/or wireless communication network(s). Computer system 100 and additional systems can be in communication via communication path 155 (e.g., to communicate data between them).

Computer system 100 includes one or more processors, such as processor 105. Processor 105 is connected to a communication infrastructure 160 (e.g., a communications bus, cross-over bar, or network). Computer system 100 can include a display interface 115 that forwards graphics, text, and other data from communication infrastructure 160 (or from a frame buffer not shown) for display on a display unit 125. Computer system 100 also includes a main memory 110, such as random access memory (RAM), and it can also include a secondary memory 165. Secondary memory 165 can include, for example, a hard disk drive 120 and/or a removable storage drive 130, representing, for example, a floppy disk drive, a magnetic tape drive, or an optical disk drive. Removable storage drive 130 reads from and/or writes to a removable storage unit 140 in a manner well known to those having ordinary skill in the art. Removable storage unit 140 represents, for example, a floppy disk, a compact disc, a magnetic tape, or an optical disk, etc. which is read by and written to by removable storage drive 130. As will be appreciated, removable storage unit 140 includes a computer readable medium having stored therein computer software and/or data.

In alternative embodiments, secondary memory 165 can include other similar means for allowing computer programs or other instructions to be loaded into the computer system. Such means can include, for example, a removable storage unit 145 and an interface 135. Examples of such means can include a program package and package interface (such as that found in video game devices), a removable memory chip (such as an EPROM, or PROM) and associated socket, and other removable storage units 145 and interfaces 135 which allow software and data to be transferred from the removable storage unit 145 to computer system 100.

Computer system 100 can also include a communications interface 150. Communications interface 150 allows software and data to be transferred between the computer system and external devices. Examples of communications interface 150 can include a modem, a network interface (such as an Ethernet card), a communications port, or a PCM-CIA slot and card, etcetera. Software and data transferred via communications interface 150 are in the form of signals which can be, for example, electronic, electromagnetic, optical, or other signals capable of being received by communications interface 150. These signals are provided to communications interface 150 via communication path (i.e., channel) 155. Communication path 155 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 110 and secondary memory 165, removable storage drive 130, and a hard disk installed in hard disk drive 120. Computer programs (also called computer control logic) are stored in main memory 110 and/or secondary memory 165. Computer programs can also be received via communications interface 150. Such computer programs, when run, enable the computer system to perform the features of the present invention as discussed herein. In particular, the computer programs, when run, enable processor 105 to perform the features of the computer system. Accordingly, such computer programs represent controllers of the computer system.

Figure 2:
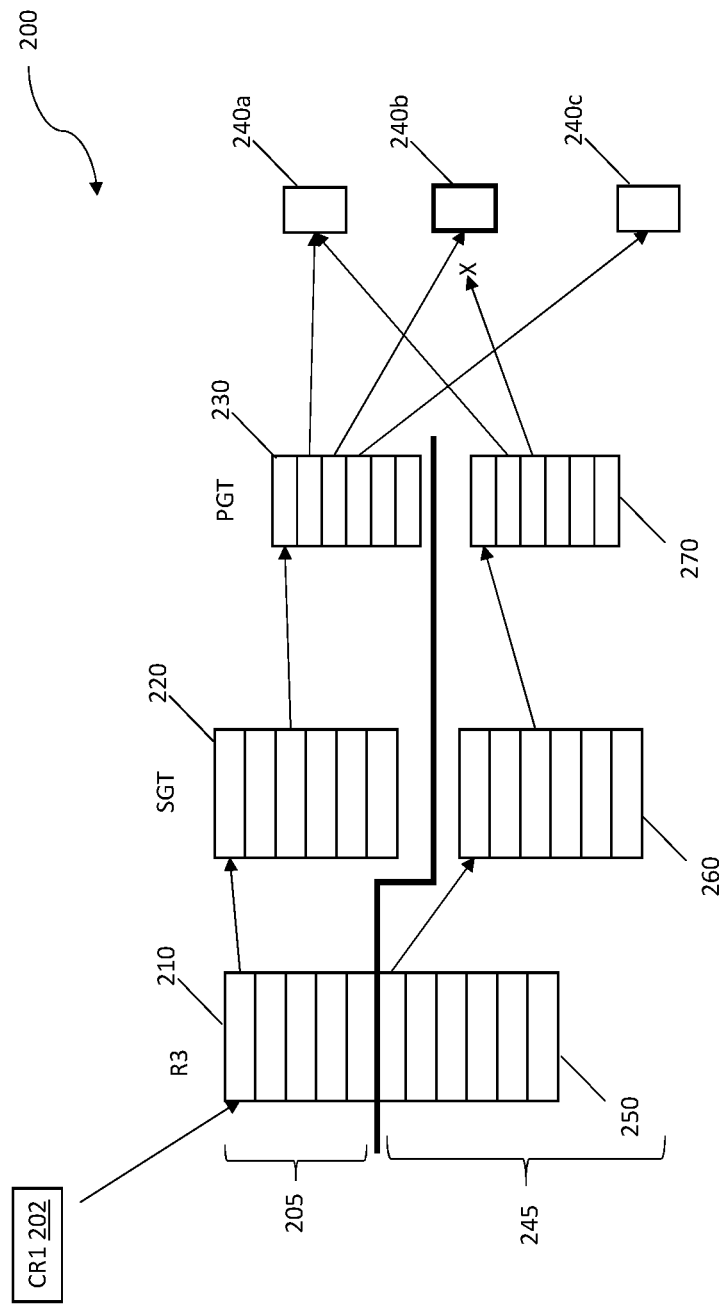
FIG. 2 depicts an updated dynamic address translation (DAT) table according to embodiments of the present invention.

FIG. 2 depicts an updated dynamic address translation ("DAT") structure 200 according to embodiments of the present invention. The updated DAT structure 200 includes a full space (or full DAT) 205 and a subspace 245. The subspace 245 is also known as the alternate table. The full space 205 includes a region third table R3 210, a segment table SGT 220, and a page table PGT 230. Entries in the region third table R3 210 each may point to a segment table SGT 220 whose entries may each point to a page table PGT 230 whose entries may each point to a page frame 240. The subspace 245 includes a region third table R3 250, a segment table SGT 260, and a page table PGT 270. Entries in the region third table R3 250 point to entries in the segment table SGT 260 that points to entries in the page table PGT 270 that point to page frames 240. A control register CR1 202 points to the region third table 210 or in some cases may point to higher level tables, such as region first (not shown) or region second (not shown). Millicode switches the control register CR1 202 between the full space 205 (as illustrated) and the subspace 245 (not illustrated). In certain embodiments, the size of the full space 205 is equal to the size of the subspace 245. The subspace 245 is switched to when a level of authorization is lower than that required for access to the full space 205. Certain pages, such as the illustrated page 245b, are not accessible from the subspace 245 in this particular example.

Figure 3:
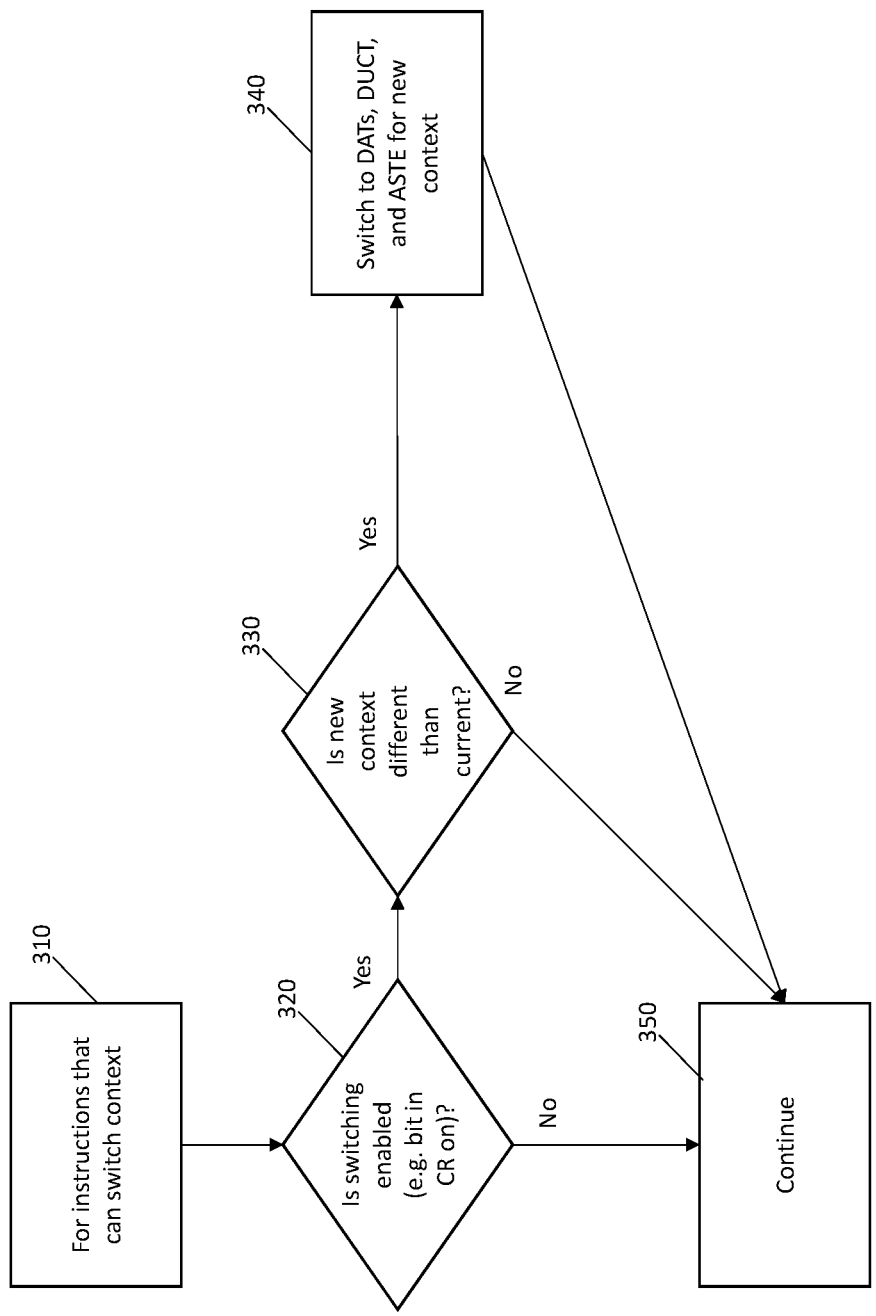
FIG. 3 depicts a flowchart of the hardware or firmware switching methodology according to embodiments of the present invention.

FIG. 3 depicts a flowchart of the hardware or firmware switching methodology according to embodiments of the present invention. For any instructions that can switch context (block 310), a check is made, by processor 105, to see if switching is enabled (block 320). Switching may be enabled, for example, by having a bit in the control register CR0 being turned on. If switching is not enabled, instruction flow continues referencing the full space 205 (block 350). If switching is enabled, a check is made, by processor 105, to determine if the new context is different from the current context (block 330). If not, instruction flow continues referencing the currently accessed space (block 350). If the new context is different than the current context, processor 105 switches to the updated DAT table 200 for context (block 340) and instruction flow continues (block 350). In addition to switching DAT of the primary space, it switches to alternate DATs for the secondary and home spaces and to alternate DUCT and ASTE for the new context.

Figure 4:
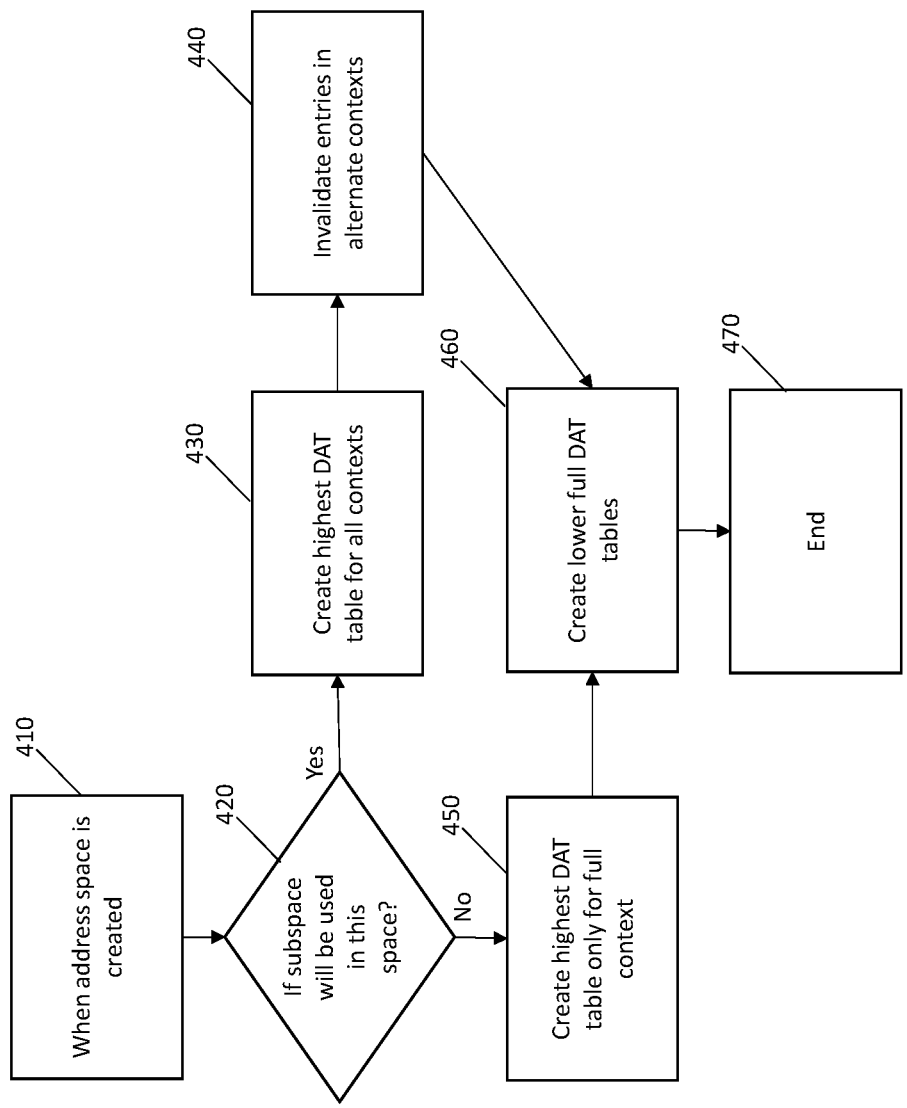
FIG. 4 depicts a flowchart of the software or operating system address space creation according to embodiments of the present invention.

FIG. 4 depicts a flowchart of the software or operating system address space creation according to embodiments of the present invention. Upon creation of a new address space (block 410), a check is made, by processor 105, to determine if a subspace will be used in this new address space (block 420). DAT tables can range from highest level to lowest level. If so, the highest level DAT table is created, by processor 105, for all contexts (block 430). Entries in alternate contexts are invalidated by processor 105 (block 440). Processor 105 creates a lower full DAT table (block 460), and the process of address space creation ends (block 470).

If a subspace will not be used in this space (block 420), the processor 105 creates a highest DAT table only for full context (block 450). A lower full DAT table is created by processor 105 (block 460), and the process ends (block 470).

Figure 5:
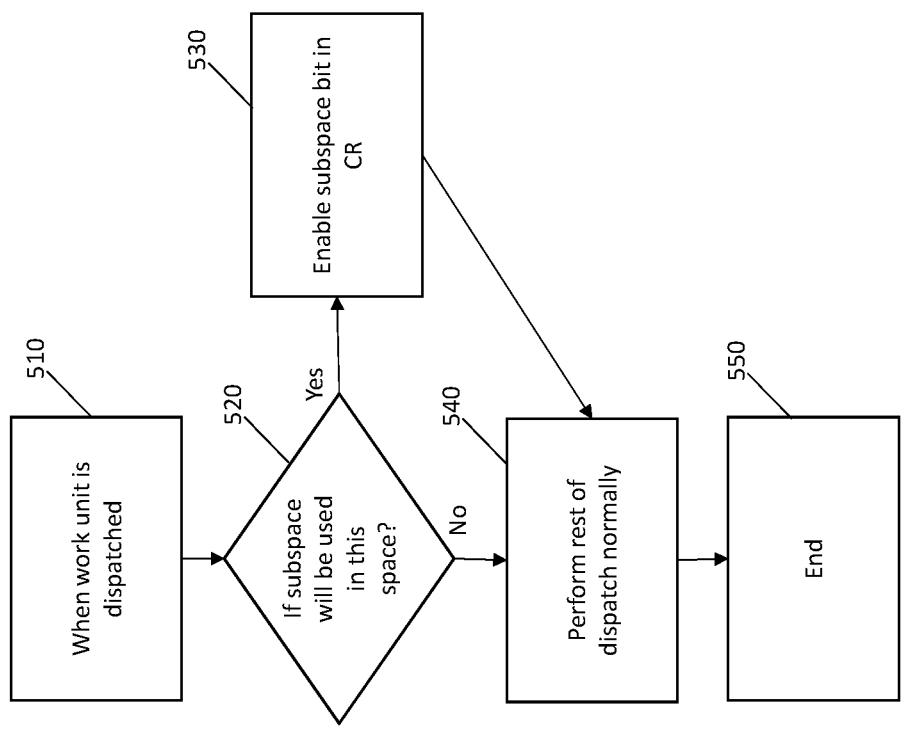
FIG. 5 depicts a flowchart of the software or operating system work unit dispatch according to embodiments of the present invention.

FIG. 5 depicts a flowchart of the software or operating system work unit dispatch according to embodiments of the present invention. Work units are threads or tasks, for example. When the work unit is dispatched by processor 105 (block 510), a check is made, by processor 105, to determine if a subspace will be used in this space (block 520). If so, processor 105 enables a subspace bit in the control register CR1 202 (block 530) and flow continues to block 540. If not, processor 105 performs the rest of the dispatch normally (block 540) and the process ends (block 550).

Figure 6:
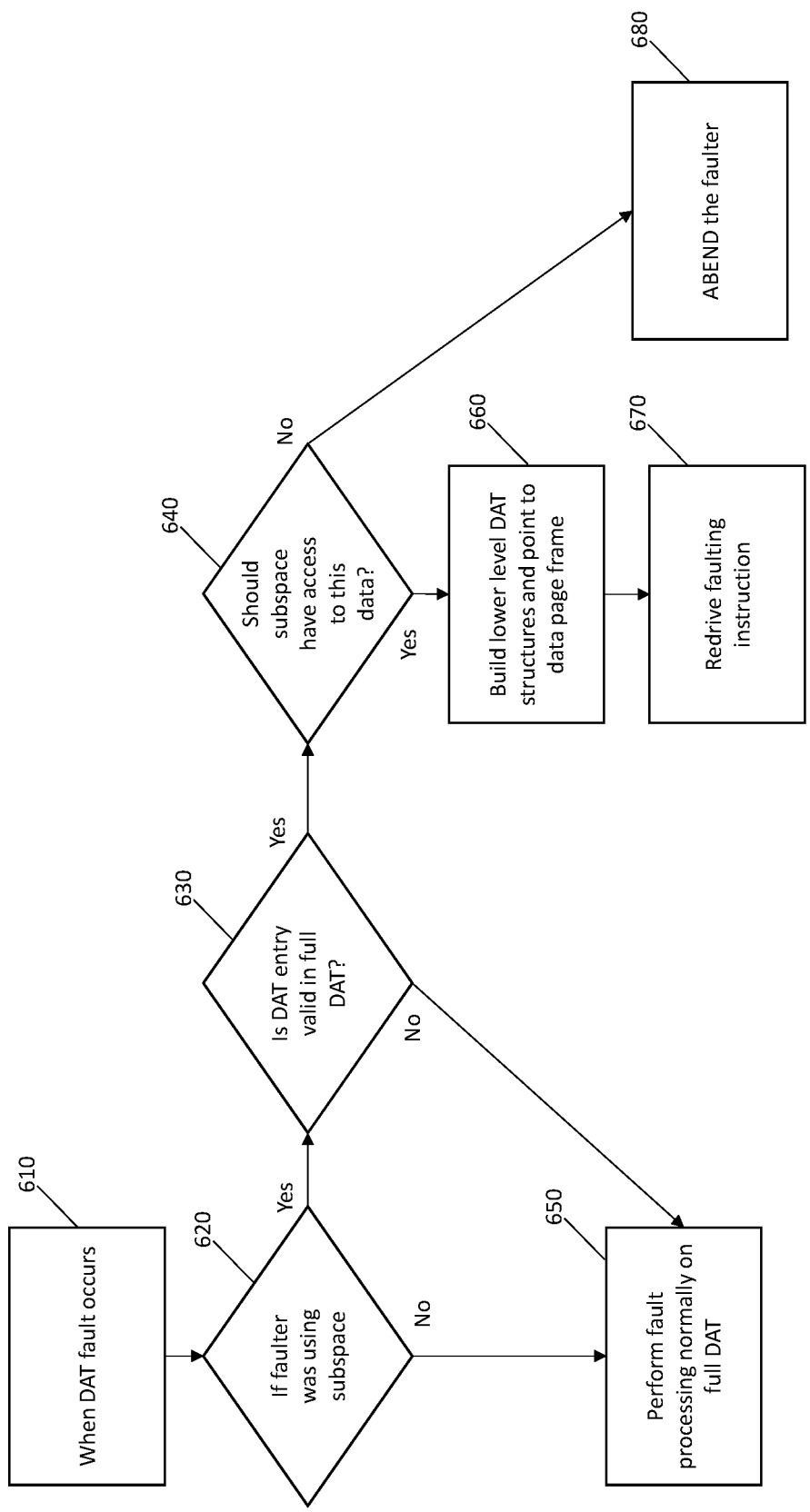
FIG. 6 depicts a flowchart of the software or operating system fault methodology according to embodiments of the present invention.

FIG. 6 depicts a flowchart of the software or operating system fault methodology according to embodiments of the present invention. When a DAT fault occurs (block 610), processor 105 checks to determine if the faulter, i.e., the instruction causing the fault, was using a subspace (block 620). If not, fault processing is performed normally, or as would occur absent the use of a subspace, on the full DAT table (block 650). If the faulter was using the subspace 245 (block 620), processor 105 checks to see if the DAT table entry is valid in the full space DAT table 205 (block 630). If not, fault processing is performed normally on the full DAT table (block 650).

If it is determined that the DAT table entry is valid in the full space DAT table (block 630), then processor 105 makes a check to determine if the subspace 245 should have access to the data being accessed (block 640). If not, the fault ends in an error (block 680). If so, the subspace 245 is built by processor 105 and pointed to the proper data page frame (block 650). The faulting instruction is then redriven by processor 105 (block 670).

Figure 7:
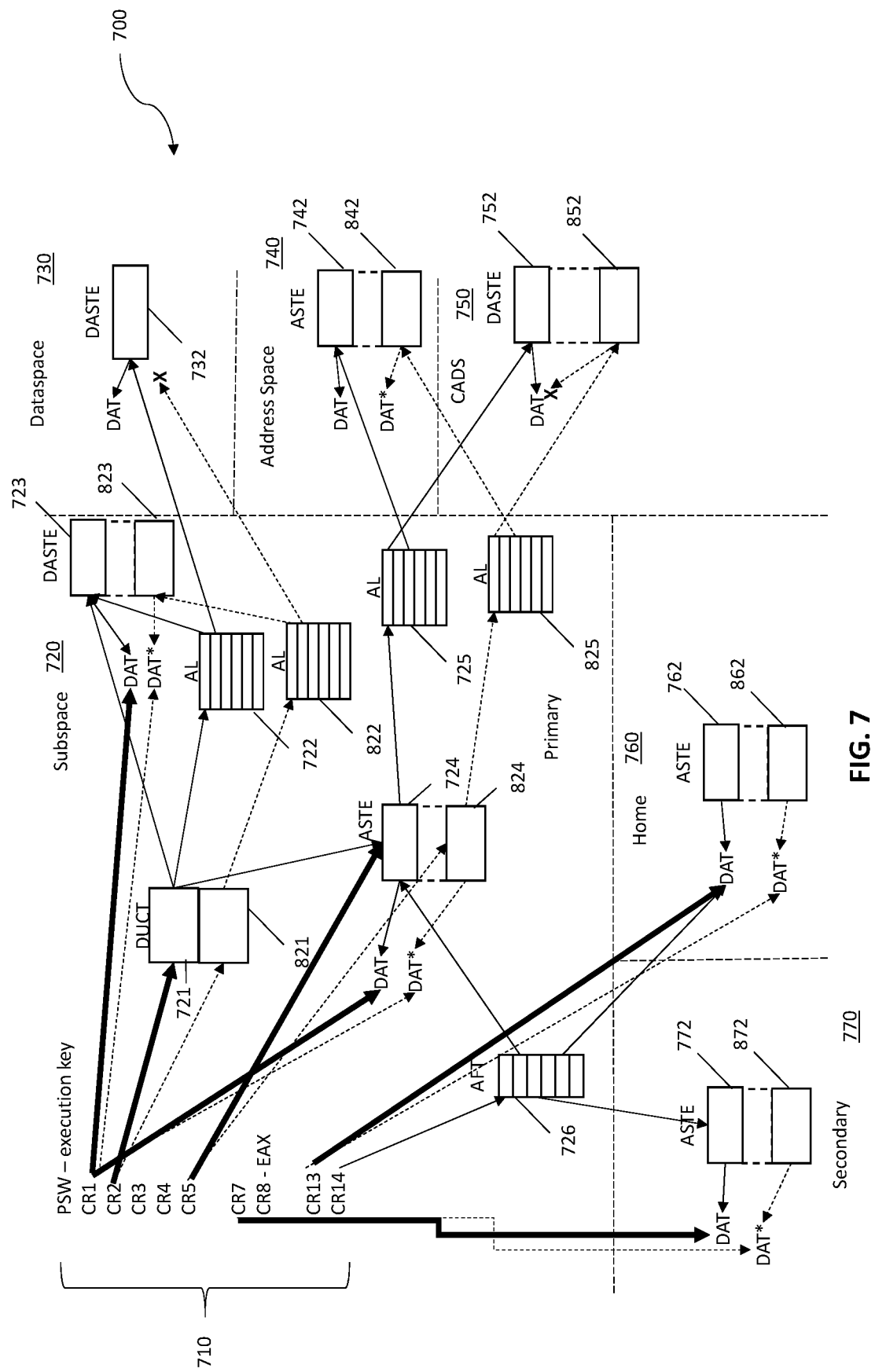
FIG. 7 depicts an updated table structure according to embodiments of the present invention; and In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

The above methodology can be extended beyond just DAT tables and into the area of ASTEs, DUCTs, ACCESS LISTS, ASTEs, and DASTEs. FIG. 7 depicts an updated table structure 700 according to embodiments of the present invention. In this figure, the following conventions will be used: conventional tables and data structures are numbered as 7xx and new tables and structures utilized by one or more embodiments of the present invention are numbered as 8xx. Furthermore, conventional relationships are shown in solid lines with the full space illustrated, whereas the newly introduced relationships utilized by one or more embodiments of the present invention are illustrated with dashed lines with the subspace illustrated.

In the illustrated embodiment of FIG. 7, a plurality of control registers 701 have bits that control switching between full space and subspace of the primary address space 724, server subspace 720, secondary space 770, home space 760, dataspace 730, address space accessed via an access list 740, and common area data space 750. Control register CR1 has a bit that indicates switching context between the full space DAT table and the server subspace DAT table (both indicated in FIG. 7 by the words "DAT"). Control register CR2 has a bit that indicates switching between DUCT 721 and DUCT 821. Control register CR7 switches between the DAT structures pointed to by ASTE 772 and ASTE 822 in secondary 770. Control Register CR13 switches between the DAT structures pointed to by ASTE 762 and ASTE 862. Control Register CR14 points to the R3 (or highest level DAT table).

Turning to the DUCT's 721 and 821, DUCT 721 points to access list 722, and DUCT 722 points to access list 822.

With respect to the ASTE's in the subspace 720, ASTE 724 points to access list 725, and ASTE 824 points to access list 825.

The access lists, of which there are two types, Primary Address Space Number Access List ("PASN-AL") and those associated with a work unit's DUCT that are called Dispatchable Unity Access Lists ("DU-AL"), point to various DASTE tables in the dataspace 730 and the Common Area Data Space ("CADS 750"). For the DU-ALs, access list 722 points to DASTE 723 and DASTE 732, while access list 822 points to DASTE 823 but is unable to point to DASTE 732. For the PASN-ALs, access list 725 points to ASTE 742 and DASTE 752, while access list 825 points to ASTE 842 and DASTE 852.

Through the use of one or more bits in various control registers 710, switching between a full space and a subspace is enabled.

Address space, work unit dispatch and fault flow are not illustrated again, as they are comparable to the flows illustrated in FIGS. 4-6.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of switching spaces having contexts between a full space context in memory storage and a subspace context of memory storage comprising:
    determining, by a processor, that switching between the full space and the subspace is enabled by examining a bit in a control register;
    determining, by the processor, that there is a new context different from an existing context based on the bit in the control register indicating that switching is enabled; and
    switching, by the processor, the context of the spaces based on determining that the new context is different from the existing context.

2. The computer-implemented method of claim 1, further comprising:
    determining, by the processor, that the subspace will be used by the new context; and
    creating, by the processor, the full space for all contexts and invalidating entries in the full space for alternate contexts.

3. The computer-implemented method of claim 2, further comprising creating, by the processor, the subspace.

4. The computer-implemented method of claim 1, further comprising:
    determining, by the processor, that the subspace will be used; and
    creating, by the processor, only the full space.

5. The computer-implemented method of claim 4, further comprising creating, by the processor, the subspace.

6. The computer implemented method of claim 1, further comprising determining, by the processor, that a faulting instruction was using the susbspace when a fault occurs.

7. The computer-implemented method of claim 6, further comprising performing fault processing normally, by the processor, based on the faulting instruction not using the subspace.

8. The computer-implemented method of claim 1, wherein each space comprises an address space second table entry (ASTEs), dispatchable unit control tables (DUCTs), access lists, and destination ASTEs (DASTEs).

9. A system for switching spaces having contexts between a full space context and a subspace context comprising:
    a processor;
    a memory communicatively coupled to the processor, the memory having stored therein instructions that when executed cause the processor to:
        determine that switching between the full space and the subspace is enabled by examining a bit in a control register;

determine that there is a new context different from an existing context based on the bit in the control register indicating that switching is enabled; and switch the context of the spaces based on determining that the new context is different from the existing context.

10. The system of claim 9, further comprising instructions that cause the processor to:

determine that the subspace will be used by the new context; and create the full space for all contexts and invalidating entries in the full space for alternate contexts.

11. The system of claim 10, further comprising instructions that cause the processor to create the subspace.

12. The system of claim 9, further comprising instructions that cause the processor to:

determine that the subspace will be used; and create only the full space.

13. The system of claim 12, further comprising instructions that cause the processor to create the subspace.

14. The system of claim 9, further comprising instructions that cause the processor to determine that a faulter was using the susbspace when a fault occurs.

15. The system of claim 14, further comprising instructions that cause the processor to perform fault processing normally based on the faulter not using the subspace.

16. The system of claim 9, wherein each space comprises an address space second table entry ("ASTEs"), dispatchable unit control tables ("DUCTs"), access lists, and destination ASTE's ("DASTEs").

17. A computer program product for switching spaces having contexts between a full space context and a subspace context, the computer program product comprising a computer readable storage medium having program instructions embodied therewith, the program instructions executable by a processor to cause the processor to:

determine that switching between the full space and the subspace is enabled by examining a bit in a control register;

determine that there is a new context different from an existing context based on the bit in the control register indicating that switching is enabled; and switch the context of the spaces based on determining that the new context is different from the existing context.

18. The computer program product of claim 17, further comprising instructions that cause the processor to:

determine that the subspace will be used by the new context; and create the full space for all contexts and invalidating entries in the full space for alternate contexts.

19. The computer program product of claim 18, further comprising instructions that cause the processor to create the subspace.

20. The computer program product of claim 17, further comprising instructions that cause the processor to:

determine that the subspace will be used; and create only the full space.

* * * * *